(12) United States Patent
Chang et al.

(10) Patent No.: US 12,457,658 B2
(45) Date of Patent: Oct. 28, 2025

(54) RADIO LINK FAILURE RECOVERY METHOD AND CORRESPONDING USER EQUIPMENT

(71) Applicant: Sharp Kabushiki Kaisha, Sakai (JP)

(72) Inventors: Ningjuan Chang, Shanghai (CN); Takako Hori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 437 days.

(21) Appl. No.: 17/923,986

(22) PCT Filed: Apr. 28, 2021

(86) PCT No.: PCT/CN2021/090694
§ 371 (c)(1),
(2) Date: Nov. 8, 2022

(87) PCT Pub. No.: WO2021/227881
PCT Pub. Date: Nov. 18, 2021

(65) Prior Publication Data
US 2023/0180330 A1 Jun. 8, 2023

(30) Foreign Application Priority Data
May 13, 2020 (CN) .......................... 202010405241.X

(51) Int. Cl.
*H04W 76/19* (2018.01)
*H04W 36/00* (2009.01)
*H04W 76/36* (2018.01)

(52) U.S. Cl.
CPC ....... *H04W 76/19* (2018.02); *H04W 36/0079* (2018.08); *H04W 76/36* (2018.02)

(58) Field of Classification Search
CPC . H04W 76/34; H04W 76/15; H04W 36/0079; H04W 76/36; H04W 76/19
See application file for complete search history.

(56) References Cited

U.S. PATENT DOCUMENTS

| | | | |
|---|---|---|---|
| 11,438,812 B2 * | 9/2022 | Kadiri | H04W 36/00838 |
| 2021/0136635 A1 * | 5/2021 | Kim | H04W 28/0263 |

(Continued)

FOREIGN PATENT DOCUMENTS

WO 2020/088592 A1 5/2020

OTHER PUBLICATIONS

Official Communication issued in International Patent Application No. PCT/CN2021/090694, mailed on Jun. 30, 2021.

(Continued)

*Primary Examiner* — Oussama Roudani
(74) *Attorney, Agent, or Firm* — Keating & Bennett, LLP

(57) ABSTRACT

The present disclosure provides a method for link failure recovery during a handover and corresponding user equipment. The method performed in the user equipment (UE) comprises: after a successful handover procedure of the UE configured with a dual active protocol stack, if a radio link failure (RLF) of a master cell group occurs at the UE, then in a radio resource control re-establishment procedure for connection recovery, or when an RLF occurs on a source link, performing, by the UE, an operation of falling back from the dual active protocol stack to a single active protocol stack, releasing a protocol stack and a configuration associated with a source base station; when the link quality of the source base station is good, releasing, by the UE, a protocol stack and a configuration associated with a target base station, resuming a single connectivity state to the source base station, and reporting the failure information to the base station.

3 Claims, 3 Drawing Sheets

(56) References Cited

U.S. PATENT DOCUMENTS

2022/0330118 A1* 10/2022 Kim .................. H04W 80/02
2023/0095601 A1* 3/2023 Wu .................. H04W 36/34
                                                            370/331
2023/0171655 A1* 6/2023 Chen .................. H04W 36/00
                                                            370/331

OTHER PUBLICATIONS

"3rd Generation Partnership Project; Technical Specification Group Radio Access Network; NR; Radio Resource Control (RRC) protocol specification (Release 15)",3GPP TS 38.331, V15.9.0, Mar. 2020, pp. 1-536.
Intel Corporation, "Running CR for the introduction of NR mobility enhancement", 3GPP TSG-RAN WG2 Meeting #109 electronic, R2-2000460, Feb. 24-Mar. 6, 2020, 29 pages.
China Telecom, "Revised WID: Even further mobility enhancement in E-UTRAN", 3GPP TSG RAN meeting #81, RP-181544, Sep. 10-13, 2018, 4 pages.
Intel Corporation, "New WID: NR mobility enhancements", 3GPP TSG RAN Meeting #80, RP-181433, May 21-25, 2018, 5 pages.
"3rd Generation Partnership Project; Technical Specification Group Radio Access Network; NR; Radio Resource Control (RRC) protocol specification (Release16)", 3GPP TS 38.331 v16.0.0, Mar. 2020, pp. 1-835.

* cited by examiner

RADIO LINK FAILURE RECOVERY METHOD AND CORRESPONDING USER EQUIPMENT

TECHNICAL FIELD

The present disclosure relates to the technical field of wireless communications. More specifically, the present disclosure relates to a handover method and corresponding user equipment.

BACKGROUND

A new research project on 5G technical standards (see non-patent literature: RP-181433: New WID on NR (New Radio) mobility enhancements) and a new research project on Long Term Evolution (LTE) system Release 16 (see non-patent literature: RP-181544) were approved at the 3rd Generation Partnership Project (3GPP) RAN #80 plenary meeting in June 2018. One of the research objectives of the two research projects is to find solutions for meeting one of mobility requirements: seamless handover, namely, to reach handover interruption time of zero milliseconds or close to zero milliseconds in a handover procedure of changing a serving cell of UE. Among solutions under study to reduce the handover interruption time, there is a solution called Dual Active Protocol Stack (DAPS) mechanism. In the DAPS mechanism, after receiving a handover command, the UE does not cut off a link (data transmission) to a source base station in a handover procedure to access a target base station, but rather, the UE can maintain connection and data transmission to the target base station and the source base station at the same time, thereby avoiding a delay caused by service interruption due to disconnection to the source base station before accessing the target base station.

The present disclosure provides a solution to the issue of how to implement the DAPS mechanism in an LTE system or an NR system.

SUMMARY

An objective of embodiments of the present disclosure is to provide a solution to the issue of how to implement a DAPS mechanism in an LTE/NR system. More specifically, the present disclosure proposes a solution to the issue of how the UE falls back to a conventional single active protocol stack when a target cell link radio link failure (RLF) occurs after a DAPS handover is successfully performed to access a target cell in an LTE/NR system. The embodiments of the present disclosure provide a method for radio link failure recovery in user equipment when DAPS is configured performed in user equipment and corresponding user equipment.

According to a first aspect of the present disclosure, provided is a method performed in user equipment (UE), including: when a radio link failure (RLF) of a master cell group (MCG) occurs at the UE, initiating, by the UE, a Radio Resource Control (RRC) connection re-establishment procedure to recover a connection to a network side; in the RRC connection re-establishment procedure, if the UE is configured with a Dual Active Protocol Stack (DAPS) bearer, performing, by the UE, a change operation from a dual active protocol stack to a single active protocol stack, and releasing a protocol stack and a configuration associated with a source base station.

In the foregoing radio link failure recovery method of the first aspect, the performance, by the UE, of a change operation from a dual active protocol stack to a single active protocol stack includes one or a plurality of the following:

operation 1: reset a Medium Access Control (MAC) entity corresponding to the source base station, and release a MAC configuration of the source base station;

operation 2: for each DAPS bearer, release a Radio Link Control (RLC) entity or entities and an associated logical channel or channels of the source base station, and reconfigure a Packet Data Convergence Protocol (PDCP) entity to release the DAPS (i.e., reconfigure a PDCP entity configured with DAPS (called a DAPS PDCP entity) as a normal non-PDCP entity (a PDCP entity not configured with DAPS));

operation 3: for each signaling radio bearer (SRB), release the PDCP entity of the source base station, and release the RLC entity or entities and the associated logical channel or channels of the source base station;

operation 4: release a physical channel configuration of the source base station; and operation 5: discard a security key or keys used in the source base station.

In the foregoing radio link failure recovery method of the first aspect, when the UE configured with a DAPS bearer determines that an RLF is not detected on a link to the source base station, the UE falls back to a single active protocol stack state where the UE maintains a connection to only the source base station, including performing one or a plurality of the following operations:

operation 1: release a configuration of a target base station;

operation 2: reset MAC for the target base station, or release a MAC configuration of the target base station;

operation 3: for each DAPS bearer, release an RLC entity or entities and an associated logical channel or channels of the target base station, and reconfigure a PDCP entity to release the DAPS (i.e., reconfigure a DAPS PDCP entity as a normal non-PDCP entity);

operation 4: for each SRB, release the PDCP entity of the target base station, release the RLC entity or entities and the associated logical channel or channels of the target base station, and if no master key update indication (e.g., indicated by a masterKeyUpdate information element) is received, configure the PDCP entity of the source base station as a continuation of a state variable or variables of the PDCP entity of the target base station;

operation 5: for each data radio bearer (DRB) that is not configured as a DAPS bearer, if no master key update indication (e.g., indicated by the masterKeyUpdate information element) is received, configure the PDCP entity of the source base station as the continuation of the state variable or variables of the PDCP entity of the target base station;

operation 6: release a physical channel configuration of the target base station;

operation 7: discard a security key or keys used in the target base station;

operation 8: discard any stored RRC message; resume a suspended SRB at the source base station;

operation 9: for each non-DAPS bearer, fall back to a UE configuration used by the DRB at the source base station (including PDCP and RLC state variables, a security configuration, and data stored in transmit and receive buffers of the PDCP and RLC entities);

operation 10: fall back to a measurement configuration used by the UE at the source base station;

operation 11: initiate a failure information procedure to report to the network side that an RLF has occurred at the target base station when DAPS is configured. Preferably, in the failure information procedure, a failure cause included in an RRC message (such as a failure information FailureInformation message) used by the UE to report the failure information is set as an MCG RLF configured with DAPS.

In the foregoing radio link failure recovery method of the first aspect, the MCG RLF occurs at the UE after the UE successfully completes a DAPS handover to the target base station.

In the foregoing radio link failure recovery method of the first aspect, the UE configured with the DAPS bearer initiates the RRC connection re-establishment procedure when it is detected that the RLF has occurred on the link between the UE and the source base station.

In the foregoing radio link failure recovery method of the first aspect, the UE performs the change operation from the dual active protocol stack to the single active protocol stack when the UE receives from the network side an RRC message including instruction information for releasing the source base station.

In the foregoing radio link failure recovery method of the first aspect, the UE transmits to the network side an RRC message including DAPS indication information, where the DAPS indication information is used to indicate that the UE is configured with the DAPS bearer; preferably, the RRC message is an RRC re-establishment request message or an RRC re-establishment request complete message.

In the foregoing radio link failure recovery method of the first aspect, the UE being configured with the DAPS bearer means that one or a plurality of DRBs of the UE are configured with a DAPS configuration information element for instructing to perform a DAPS handover operation.

In the foregoing radio link failure recovery method of the first aspect, when the UE detects that the RLF has occurred on the link of the source base station, the UE performs one or a plurality of the following operations:

operation 1: reset the MAC for the source base station, or release the MAC configuration of the source base station;

operation 2: for each DAPS bearer, release the RLC entity or entities and the associated logical channel or channels of the source base station, and reconfigure the PDCP entity to release the DAPS (i.e., reconfigure the PDCP entity configured with DAPS (called the DAPS PDCP entity) as the normal non-PDCP entity (a PDCP entity not configured with DAPS));

operation 3: for each SRB, release the PDCP entity of the source base station, and release the RLC entity or entities and the associated logical channel or channels of the source base station;

operation 4: release the physical channel configuration of the source base station; and operation 5: discard the security key or keys used in the source base station.

According to a second aspect of the present disclosure, provided is user equipment (UE), including: a processor; and a memory storing instructions, where the instructions, when run by the processor, perform the radio link failure recovery method according to the context.

According to another aspect of the present disclosure, provided is a radio link failure recovery method, including:

in an RRC connection re-establishment procedure, if user equipment (UE) is configured with a Dual Active Protocol Stack (DAPS) bearer, performing, by the UE, a change operation from a dual active protocol stack to a single active protocol stack:

releasing a configuration of a source master base station;

resetting Medium Access Control (MAC) for the source base station, or releasing a MAC configuration of the source base station;

for each DAPS bearer, releasing a Radio Link Control (RLC) entity or entities an associated logical channel or channels of the source base station, and reconfiguring a Protocol Data Aggregation Protocol (PDCP) entity to release the DAPS;

for each signaling radio bearer (SRB), releasing the PDCP entity of the source base station, and releasing the RLC entity or entities and the associated logical channel or channels of the source base station;

releasing a physical channel configuration of the source base station; and discarding a security key or keys used in the source base station.

In addition, according to another aspect of the present disclosure, provided is a radio link failure recovery method, including:

when a timer T310 associated with a source primary cell (PCell) expires, or an indication of a random access problem is received from MAC of a source master cell group (MCG), or an indication that a maximum number of retransmissions has been reached is received from RLC of the source MCG, considering, by the UE, that an RLF has occurred on a link of the monitored source MCG; and resetting the MAC for the source base station.

In addition, according to another aspect of the present disclosure, provided is user equipment (UE), including a processor configured to:

in an RRC connection re-establishment procedure, if the UE is configured with a Dual Active Protocol Stack (DAPS) bearer, perform, by the UE, a change operation from a dual active protocol stack to a single active protocol stack:

releasing a configuration of a source master base station;

resetting Medium Access Control (MAC) for the source base station, or releasing a MAC configuration of the source base station;

for each DAPS bearer, releasing a Radio Link Control (RLC) entity or entities and an associated logical channel or channels of the source base station, and reconfiguring a Protocol Data Aggregation Protocol (PDCP) entity to release the DAPS;

for each signaling radio bearer (SRB), releasing the PDCP entity of the source base station, and releasing the RLC entity or entities and the associated logical channel or channels of the source base station;

releasing a physical channel configuration of the source base station; and discarding a security key or keys used in the source base station.

In addition, according to another aspect of the present disclosure, provided is user equipment (UE), including a processor configured to:

when a timer T310 associated with a source primary cell (PCell) expires, or an indication of a random access problem is received from MAC of a source master cell group (MCG), or an indication that a maximum number of retransmissions has been reached is received from RLC of the source MCG, consider, by the UE, that an RLF has occurred on a link of the monitored source MCG; and reset the MAC for the source base station.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
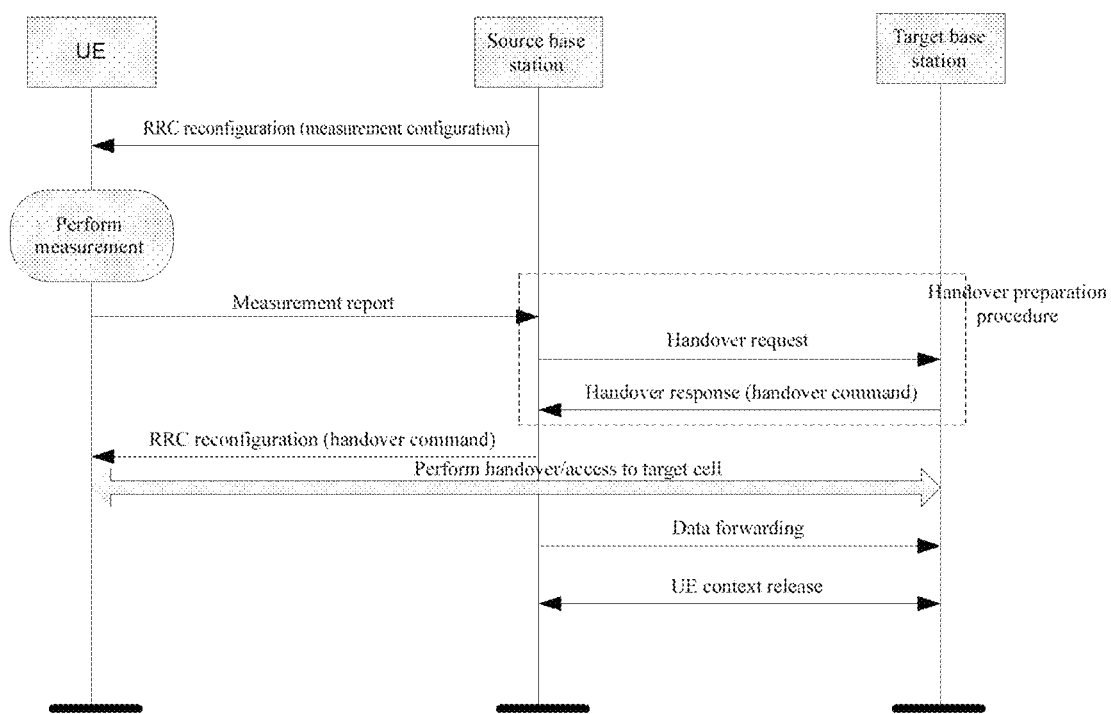
FIG. 1 is a sequence diagram showing that user equipment (UE) in a connected state changes a serving cell by means of a handover procedure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of the primary cell and intra-cell change of the primary cell. That is, a primary cell of UE is changed from a source cell to a target cell, where the source cell and the target cell may be the same cell or different cells. In this procedure, a security key or keys or a security algorithm for access layer security may also be accordingly updated. The security includes encryption and decryption and integrity protection. The source cell may also be referred to as a source base station, or a source beam, a source transmission point (TRP), a source primary cell (PCell), or a source master cell group (MCG); the target cell may also be referred to a target base station, or a target beam, a target transmission point, a target primary cell (PCell), or a target master cell group (MCG). The source cell refers to a connected cell serving the UE before a handover procedure is initiated, namely, a cell transmitting to the UE an RRC message including a handover command. The target cell refers to a cell connected to and serving the UE after the handover procedure is successfully completed, or a cell indicated by a target cell identifier included in the handover command. The handover command described in the present disclosure is used to trigger the UE to execute a handover. In an NR system, the handover command is an RRC reconfiguration message including a reconfiguration with sync (Reconfigurationwithsync) information element, or rather, the handover command is an RRC reconfiguration message including a reconfiguration with sync (Reconfigurationwithsync) information element for a master cell group (MCG). In this case, the handover may also be referred to as an MCG synchronized reconfiguration. In an LTE system, the handover command is an RRC connection reconfiguration message including a mobility control information (MobilityControlInformation) information element. The synchronized reconfiguration information element or the mobility control information information element includes configuration information of the target cell, for example, a target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to the RRC message including the handover command, and refers to an RRC message or a configuration in the RRC message triggering the UE to execute a handover. The handover configuration refers to all of or part of configurations in the handover command "Cancel", "release", "delete", "flush", and "clear" are interchangeable. "Execute", "use", and "apply" are interchangeable. "Configure" and "reconfigure" are interchangeable. "Monitor" and "detect" are interchangeable.

The following describes processes or concepts in the prior art to which the present disclosure relates.

Handover Configuration in NR Systems:

In an NR system, an RRC reconfiguration message for a handover command carries RRC configurations from a target base station, including but not limited to the following RRC configurations (see Section 6.2.2 of 3GPP Technical Standard Protocol 38.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

A cell group configuration (cellGroupConfig information element), used to configure a master cell group or a secondary cell group, including an RLC bearer configuration (rlc-bearerToAddModList information element and rlc-bearerToreleaselist information element), a MAC configuration (MAC-cellgroupconfig information element), a physical layer configuration, a secondary cell addition/modification/release configuration, a special cell (SpCell) configuration corresponding to a DRB/SRB, etc. The spcell configuration includes a cell index number, handover information (reconfigurationWithSync information element), a radio link failure related timer and constant configuration, a Radio Link Monitoring (RLM) configuration, a special cell dedicated configuration, etc. The reconfigurationwithsync information element is similar to the mobility control information in the LTE system and includes handover related information to implement mobility, and the information element includes serving cell configuration common information, a C-RNTI of the UE in the target cell, a handover related timer T304 configuration, a random access dedicated configuration for a random access procedure to the target cell.

Non-access stratum dedicated information (dedicatedInfoNASList information element).

A radio bearer configuration (radiobearerConfig information element), used to configure a Service Data Application Protocol layer (SDAP) and a PDCP of a radio bearer DRB and/or an SRB.

A master key update configuration (masterKeyupdate information element).

Other configurations (otherconfig information element), used to configure a proximity report configuration (reportproximityconfig information element)), an In-Device Coexistence (IDC) configuration, a power preference indication configuration (powerprefIndicationconfig information element), a location obtaining configuration (obtainlocationconfig Information Element), etc.

General Handover Procedure in LTE/NR Systems:

User mobility in a connected state is implemented mainly by means of a handover procedure, and the handover refers to a procedure in which UE in an RRC connected state changes a serving cell (primary cell). FIG. 1 is a sequence diagram showing that user equipment (UE) in a connected state changes a serving cell by means of a handover procedure. As shown in FIG. 1, the handover procedure generally includes the following phases:

Phase 1, a measurement phase. A base station issues a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as load of the base station, whether to trigger a handover for the UE. If it is determined to trigger a handover for the UE, then a source base station initiates a handover preparation procedure by transmitting a handover request message to a target base station. The target base station determines, according to the context of the UE in the handover request message, available resources of the target base station, and other factors, whether to accept this handover request of the UE. If so, then the target base station replies to the source base station with a handover acknowledgment message, wherein the handover acknowledgment message includes an inter-node RRC message, namely, a handover command.

Phase 3, a handover execution phase. The source base station issues the handover command to the UE, and starts to forward data of the UE to the target base station. UE receiving the handover command immediately uses a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

Daps Handover:

The DAPS handover introduced in Release 16 refers to a handover procedure in which after UE receives an RRC message for handover, the UE still maintains a connection to a source base station until the source base station is released after a random access procedure to a target base station is successfully performed. In this procedure, the UE continues receiving downlink data from the source base station until the source base station is released, and the user continues transmitting uplink data to the source base station until the random access procedure to the target base station is successfully completed. After the random access procedure to the target base station is completed, a MAC layer indicates to an upper layer that the random access procedure is completed, and after receiving the indication, an RRC layer instructs a lower layer (e.g., a PDCP layer) to perform an uplink data switch, to switch an uplink path from the source base station to the target base station. When the PDCP layer is requested to perform the uplink data switch, a PDCP data protocol data unit (PDU) of the PDCP layer is delivered to an RLC entity or entities associated with the target base station, a PDCP control PDU associated with the source base station is delivered to an RLC entity or entities associated with the source base station, and a PDCP control PDU associated with the target base station is delivered to an RLC entity or entities associated with the target base station.

Figure 2:
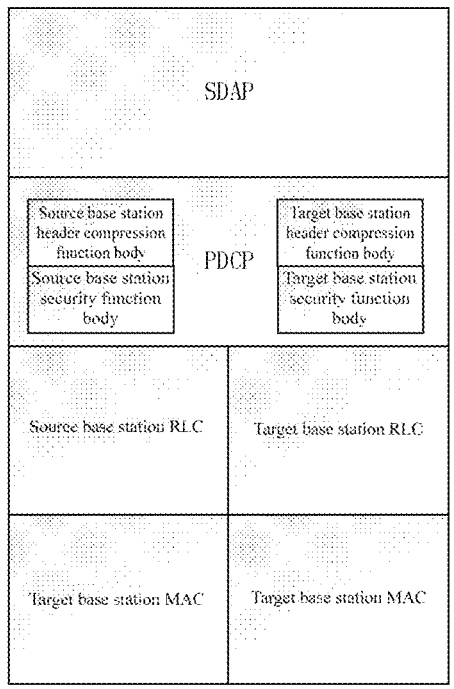
FIG. 2 is a schematic diagram showing a protocol stack related to a DAPS bearer in a dual active protocol stack configuration.

In the case of the DAPS handover, after receiving a handover command, the UE establishes a MAC entity for the target base station. If a DRB is configured as a DAPS bearer, the UE establishes for the DRB an RLC entity and a dedicated traffic logical channel (DTCH) associated with the target base station, reconfigures a PDCP entity associated with the DAPS bearer as a DAPS PDCP entity which is a PDCP entity that has security and robust header compression (ROHC) functions respectively associated with the source base station and the target base station, and respectively associates the security and ROHC functions with the corresponding RLC entities configured for the source base station and the target base station. In the above manner, in the DAPS handover procedure, the UE maintains active protocol stacks for the source base station and the target base station at the same time, as shown in FIG. 2.

In the DAPS procedure, if a radio link failure occurs at the source base station, the UE will suspend transmission of all DRBs in the source base station and release a connection of the source base station. After the DAPS handover is completed, the UE receives an RRC reconfiguration message transmitted from the target base station, which carries instruction information (e.g., identified by a daps-SourceRelease information element) used to instruct to release the source base station. After receiving the instruction, the UE performs an operation of releasing a configuration and a protocol stack of the source base station. The operation includes one or a plurality of the following: resetting MAC for the source base station, or releasing a MAC configuration of the source base station; for each DAPS bearer, releasing the RLC entity or entities and an associated logical channel or channels of the source base station, reconfiguring a PDCP entity to release the DAPS (i.e., reconfigure a PDCP entity configured with DAPS (called a DAPS PDCP entity) as a normal non-PDCP entity (a PDCP entity not configured with DAPS)); for each SRB, releasing the PDCP entity of the source base station, and releasing the RLC entity or entities and the associated logical channel or channels of the source base station; releasing a physical channel configuration of the source base station; discarding a security key or keys used in the source base station.

When the DAPS handover fails, that is, a T304 timer used to monitor the handover procedure expires, then if no radio link failure is detected at the source base station, the UE falls back to a connection to the source base station, and reports the DAPS handover failure via the source base station, instead of triggering an RRC connection re-establishment procedure. In the process of fall back to the connection to the source base station, the UE falls back from the DAPS state to a single active protocol stack state in which only communication with the source base station is maintained, by performing one or a plurality of the following operations: releasing a configuration of the target base station; resetting MAC for the target base station or releasing a MAC configuration of the target base station; for each DAPS bearer, releasing the RLC entity or entities and an associated logical channel or channels of the target base station, and reconfiguring a PDCP entity to release the DAPS (i.e., reconfiguring a DAPS PDCP entity to a normal non-PDCP entity); for each SRB, releasing the PDCP entity of the target base station, releasing the RLC entity or entities and an associated logical channel or channels of the target base station, and if a master key update instruction is not received, then configuring the PDCP entity of the source base station as a continuation of a state variable or variables of the PDCP entity; releasing a physical channel configuration of the target base station; discarding a security key or keys used in the target base station; discarding any stored RRC message; resuming a suspended SRB or SRBs at the source base station; for each non-DAPS Bearer, falling back to a UE configuration used by the DRB at the source base station (including PDCP and RLC state variables, a security configuration, and data stored in transmit and receive buffers of the PDCP and RLC entities); falling back to a measurement configuration used by the UE at the source base station.

Radio Link Failure (RLF):

The UE considers that an RLF has occurred when the following conditions occur: a timer T310 used for RLF monitoring expires, a timer T312 used for fast RLF monitoring expires, an indication of a random access problem from a MAC layer is received, and an indication for indicating that the number of retransmissions has reached a maximum number from an RLC entity is received. During the DAPS handover, if the above timer, MAC entity, and RLC are associated with the source base station MCG, it is considered that a source base station MCG RLF has been detected; if the above timer, MAC entity, and RLC are associated with the target base station MCG, it is considered that a target base station MCG RLF has been detected. In dual connectivity (DC), the UE is configured with a secondary cell group (SCG). If the above timer, MAC entity, and RLC are associated with the SCG, it is considered that an SCG RLF has been detected.

The following two scenarios are considered in this disclosure:

Scenario 1: An RLF occurs at the UE after a successful DAPS handover. The RLF refers to a link failure of a PCell after the successful handover, or a link failure of a target cell of the DAPS handover. In this case, the link between the UE and the source base station is also in an RLF state. The RLF of the source link may occur during the DAPS handover procedure (T304 is running) or after the DAPS handover procedure is successfully completed. That is, the random access procedure of the UE to the target base station is successfully completed.

Scenario 2: An RLF occurs at the UE after a successful DAPS handover. The RLF refers to a link failure of the PCell after the successful handover, or a link failure of the target cell of the DAPS handover. In this case, the link between the UE and the source base station is not in the RLF state, that is, the link quality state of the source link is good.

In the above two cases, the UE needs to fall back from the DAPS state, i.e., the dual active protocol stack state, to a single active protocol stack state, so as to continue a next operation, such as performing an RRC connection re-establishment procedure. Otherwise, when the UE in the DAPS state performs the connection recovery procedure with the network side in the presence of the RLF in the above two scenarios, the network side cannot know whether the UE is in the DAPS state, and the states of the UE and the network side do not match, which may cause RRC reconfiguration to fail after the connection recovery procedure of the UE fails. The present disclosure provides solutions to the above problems on the basis of the above scenarios, but is not limited to the above scenarios.

Embodiment 1

Figure 3:
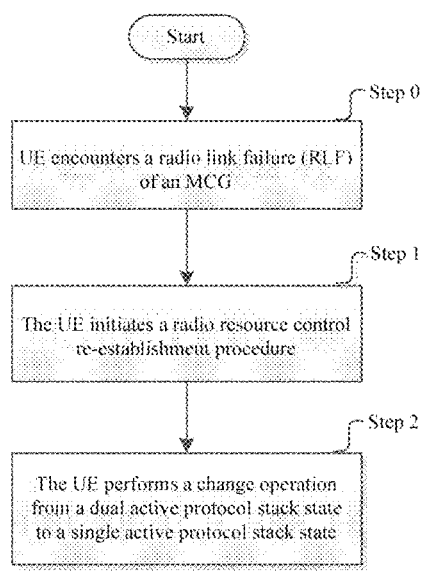
FIG. 3 is a flowchart showing a radio link failure recovery method according to Embodiment 1.

This embodiment provides a method for UE to autonomously perform a fallback from a DAPS state to a single active protocol stack (non-DAPS) state in an RRC connection re-establishment procedure (as shown in FIG. 3).

Step 1: The UE initiates an RRC re-establishment procedure.

Preferably, the UE can initiate the RRC re-establishment procedure when one of the following conditions is satisfied: in step 0, when an RLF of an MCG is detected; when the RLF of the MCG is detected and a timer 316 is not configured; or when a synchronization reconfiguration of the MCG fails, i.e., a handover fails. When the UE is configured with DAPS, the RLF of the MCG refers to an RLF of a target base station after a handover command is received or after the handover succeeds. The successful handover as mentioned above refers to successful completion of random access to the target base station at a MAC layer. The timer T316 is used to monitor an MCG failure information procedure (or referred to as a fast MCG recovery procedure). T316 is started when the UE transmits an MCG failure information message or triggers an MCG failure information procedure. T316 is stopped when the UE receives from a network side a response message such as an RRC reconfiguration message or an RRC release message, or when an RRC connection re-establishment procedure is initiated. When T316 expires, the UE considers that an MCG failure information procedure ends with failure, and the UE can perform the RRC re-establishment procedure.

Step 2: In the RRC re-establishment procedure, such as an initialization phase of the RRC re-establishment procedure, the UE performs an operation of falling back from the DAPS state to the single active protocol stack (non-DAPS) state, and releases a protocol stack and a configuration associated with the source base station. The operations include one or a plurality of the following:

Operation 1: Reset MAC for the source base station, or release a MAC configuration of the source base station.

Operation 2: For each DAPS bearer, release an RLC entity or entities and an associated logical channel or channels for the source base station, and reconfigure a PDCP entity to release the DAPS (i.e., reconfigure a PDCP entity configured with DAPS (called a DAPS PDCP entity) as a normal non-PDCP entity (a PDCP entity not configured with DAPS)).

Operation 3: For each SRB, release the PDCP entity for the source base station, and release an RLC entity or entities and the associated logical channel or channels for the source base station.

Operation 4: Release a physical channel configuration for the source base station.

Operation 5: Discard a security key or keys used in the source base station.

The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 2

This embodiment provides a method for a network side to instruct a UE to perform a fallback from a DAPS state to a single active protocol stack (non-DAPS) state in an RRC connection re-establishment procedure on the basis of DAPS information reported by the UE by means of displayed RRC signaling.

Step 1: The UE initiates an RRC re-establishment procedure.

The triggering of the RRC re-establishment procedure initiated by the UE is the same as that described in Embodiment 1.

Step 2: In the RRC re-establishment procedure, the UE carries a DAPS indication message in an RRC connection re-establishment request message or an RRC connection re-establishment complete message, which is used to indicate to the network side that the UE is configured with DAPS, or the UE is configured with any one or plurality of DAPS bearers.

Step 3: Receive from a base station an RRC message including an information element for instructing to release the source base station. The RRC message may be an RRC connection re-establishment message or an RRC reconfiguration message. Preferably, the RRC reconfiguration message is the first RRC reconfiguration message after the RRC re-establishment procedure is completed. Preferably, the information element for instructing to release the source base station is a daps-sourcerelease information element, which is used to instruct the UE to release the source base station, including a source cell part for stopping a DAPS operation and a source cell part for releasing a DAPS configuration. Preferably, the information element including the information element for instructing to release the source base station can also be described as that an information element for instructing to release the source base station set is set to TRUE or 1.

In this step, after the UE receives the RRC message including the above information element, the UE performs an operation of falling back from the DAPS state to the single active protocol stack (non-DAPS) state, and releases a protocol stack and a configuration associated with the source base station. The operation includes one or a plurality of the following:

Operation 1: Reset MAC for the source base station, or release a MAC configuration of the source base station.

Operation 2: For each DAPS bearer, release an RLC entity or entities and an associated logical channel or channels of the source base station, and reconfigure a PDCP entity to release the DAPS (i.e., reconfigure a PDCP entity configured with DAPS (called a DAPS PDCP entity) as a normal non-PDCP entity (a PDCP entity not configured with DAPS)).

Operation 3: For each SRB, release the PDCP entity of the source base station, and release the RLC entity or entities and the associated logical channel or channels of the source base station.

Operation 4: Release a physical channel configuration of the source base station.

Operation 5: Discard a security key or keys used in the source base station.

The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 3

This embodiment provides a method for a UE to perform a fallback from a DAPS state to a single active protocol stack (non-DAPS) state and fall back to a connection to a source base station in the above scenario 2, so as to avoid initiating an RRC connection re-establishment procedure.

Step 1: The UE detects that an RLF of an MCG has occurred.

The MCG refers to a target MCG at the time of a DAPS handover.

Step 2: If the source base station does not detect an RLF, the UE releases a target base station part of a DAPS operation, and performs an operation of returning from the DAPS state to the single active protocol stack (non-DAPS) state. The operation includes one or a plurality of the following:

Operation 1: Release a configuration of a target base station.

Operation 2: Reset MAC for the target base station or release a MAC configuration of the target base station.

Operation 3: For each DAPS bearer, release an RLC entity or entities and an associated logical channel or channels of the target base station, and reconfigure a PDCP entity to release the DAPS (i.e., reconfigure a DAPS PDCP entity as a normal non-PDCP entity).

Operation 4: For each SRB, release the PDCP entity of the target base station, release the RLC entity or entities and the associated logical channel or channels of the target base station, and if no master key update indication (e.g., indicated by a masterKeyUpdate information element) is received, configure the PDCP entity of the source base station as a continuation of a state variable or variables of the PDCP entity of the target base station.

Operation 5: For each DRB that is not configured as a DAPS bearer, if no master key update indication (e.g., indicated by the masterKeyUpdate information element) is received, configure the PDCP entity of the source base station as the continuation of the state variable or variables of the PDCP entity of the target base station.

Operation 6: Release a physical channel configuration of the target base station.

Operation 7: Discard a security key or keys used in the target base station.

Operation 8: Discard any stored RRC message; resume a suspended SRB or SRBs at the source base station.

Operation 9: For each non-DAPS bearer, fall back to a UE configuration used by the DRB at the source base station (including PDCP and RLC state variables, a security configuration, and data stored in transmit and receive buffers of the PDCP and RLC entities).

Operation 10: Fall back to a measurement configuration used by the UE at the source base station.

Operation 11: Initiate a failure information procedure to report to the network side that an RLF has occurred at the target base station when DAPS is configured. Preferably, in the failure information procedure, a failure cause included in an RRC message (such as a failure information FailureInformation message) used by the UE to report the failure information is set as an MCG RLF configured with DAPS.

Before step 1, the method further includes: if the UE successfully completes a DAPS handover, that is, when the UE is configured with any DAPS bearer, the MAC layer successfully completing the random access procedure to the target base station, in which case T304 is not in a running state. That is, step 2 is performed when the UE is configured with any one or a plurality of DAPS bearers.

Embodiment 4

This embodiment provides a method for UE to perform a fallback from a DAPS state to a single active protocol stack (non-DAPS) state when an RLF occurs at a source base station.

Step 1: A source RLF occurs in a DAPS procedure. That is, when the UE is configured with any DAPS bearer, the UE detects an RLF of a source MCG.

Step 2: Perform a fallback from the DAPS state to the single active protocol stack (non-DAPS) state, and release a configuration and a protocol stack of the source base station. The operation includes one or a plurality of the following:

Operation 1: Suspend transmission of all DRBs in the source base station.

Operation 2: Release a connection of the source base station.

Operation 3: Reset MAC for the source base station, or release a MAC configuration of the source base station.

Operation 4: For each DAPS bearer, release an RLC entity or entities and an associated logical channel or channels of the source base station, and reconfigure a PDCP entity to release the DAPS (i.e., reconfigure a PDCP entity configured with DAPS (called a DAPS PDCP entity) as a normal non-PDCP entity (a PDCP entity not configured with DAPS)).

Operation 5: For each SRB, release the PDCP entity of the source base station, and release the RLC entity or entities and the associated logical channel or channels of the source base station.

Operation 6: Release a physical channel configuration of the source base station; Operation 7: Discard a security key or keys used in the source base station.

It is worth noting that this embodiment is not limited to the aforementioned scenario 1 and scenario 2 of the present disclosure, and is also applicable to the case of the source base station RLF occurring when the DAPS has not been completed, i.e., when T304 is running.

Embodiment 5

This embodiment corresponds to Embodiment 2, and provides a corresponding method at a base station side.

Step 1: In an RRC re-establishment procedure, receive an RRC connection re-establishment request message from UE or the RRC connection re-establishment complete message carries DAPS indication information, for the UE to indicate to the network side that the UE is configured with DAPS, or that the UE is configured with any one or a plurality of DAPS bearers.

Step 2: Transmit to the UE an RRC message including an information element for instructing to release a source base station. The RRC message may be an RRC connection re-establishment message or an RRC reconfiguration message. Preferably, the RRC reconfiguration message is the first RRC reconfiguration message after the RRC re-establishment procedure is completed. Preferably, the information element for instructing to release the source base station is a daps-sourcerelease information element, which is used to instruct the UE to release the source base station, including a source cell part for stopping a DAPS operation and a source cell part for releasing a DAPS configuration. Preferably, the information element including the information element for instructing to release the source base station can also be described as that an information element for instructing to release the source base station set is set to TRUE or 1.

In this step, the information element instructs to release the source base station, such that after receiving the information element, the UE performs an operation of falling back from a DAPS state to a single active protocol stack (non-DAPS) state, and releases a protocol stack and a configuration associated with the source base station. The operation includes one or a plurality of the following:

Operation 1: Reset MAC for the source base station, or release a MAC configuration of the source base station.

Operation 2: For each DAPS bearer, release an RLC entity or entities and an associated logical channel or channels of the source base station, and reconfigure a PDCP entity to release the DAPS (i.e., reconfigure a PDCP entity configured with DAPS (called a DAPS PDCP entity) as a normal non-PDCP entity (a PDCP entity not configured with DAPS)).

Operation 3: For each SRB, release the PDCP entity of the source base station, and release the RLC entity or entities and the associated logical channel or channels of the source base station.

Operation 4: Release a physical channel configuration of the source base station.

Operation 5: Discard a security key or keys used in the source base station.

The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 6

Figure 4:
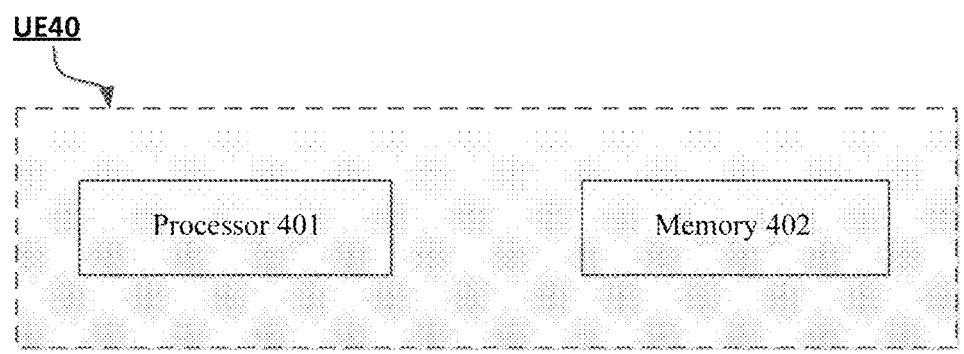
FIG. 4 is a block diagram showing user equipment (UE) related to the present disclosure.

In this embodiment, user equipment according to the present disclosure is described. FIG. 4 is a block diagram showing user equipment (UE) involved in the present invention. As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. When run by the processor 401, the instructions can perform the radio link recovery method described above in detail in the present invention.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A radio link failure recovery method performed by a user equipment (UE), the radio link failure recovery method comprising:
   initiating a Radio Resource Control (RRC) connection re-establishment procedure based on a handover failure; and
   performing a plurality of operations in the RRC connection re-establishment procedure, based on any Dual Active Protocol Stack (DAPS) configured for the UE,
   wherein the plurality of operations includes:
   resetting Medium Access Control (MAC) for a source base station;
   releasing a MAC configuration for the source base station;
   for each DAPS bearer, releasing a Radio Link Control (RLC) entity or entities and an associated logical channel or channels for the source base station, and reconfiguring a Protocol Data Aggregation Protocol (PDCP) entity to release the DAPS;

for each signaling radio bearer (SRB), releasing a PDCP entity for the source base station, and releasing an RLC entity and an associated logical channel for the source base station;

releasing a physical channel configuration for the source base station; and discarding security keys used in the source base station.

2. A user equipment (UE), comprising a processor; and a memory in which instructions are stored, wherein the processor is configured by the instructions to:

initiate a Radio Resource Control (RRC) connection re-establishment procedure based on a handover failure; and perform a plurality of operations in the RRC connection re-establishment procedure, based on any Dual Active Protocol Stack (DAPS) configured for the UE, wherein the plurality of operations includes:

resetting Medium Access Control (MAC) for a source base station;

releasing a MAC configuration for the source base station;

for each DAPS bearer, releasing a Radio Link Control (RLC) entity or entities and an associated logical channel or channels for the source base station, and reconfiguring a Protocol Data Aggregation Protocol (PDCP) entity to release the DAPS;

for each signaling radio bearer (SRB), releasing a PDCP entity for the source base station, and releasing an RLC entity and an associated logical channel for the source base station;

releasing a physical channel configuration for the source base station; and discarding security keys used in the source base station.

3. The UE according to claim 2, wherein the processor is further configured to:

when any DAPS is configured and a timer T304 is running, upon expiry of a timer T310 for a source master cell group (MCG), or upon random access problem indication from MAC for the source MCG, or upon indication from RLC for the source MCG that a maximum number of retransmissions has been reached, consider a radio link failure to be detected for the source MCG; and reset the MAC for the source MCG.

\* \* \* \* \*